Aug. 13, 1946.　　　T. J. SMULSKI　　　2,405,910
WINDSHIELD WIPER
Filed Nov. 27, 1943
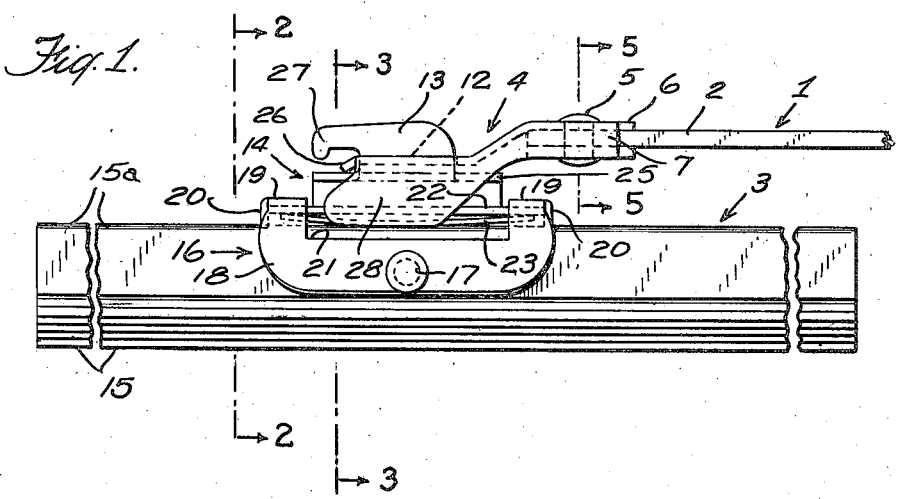
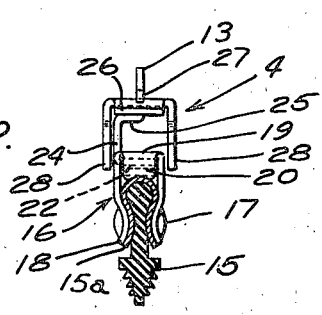
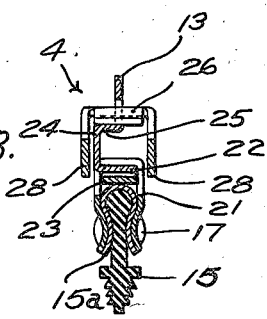
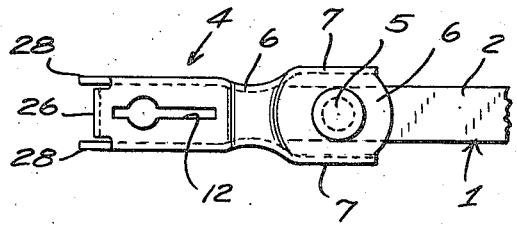
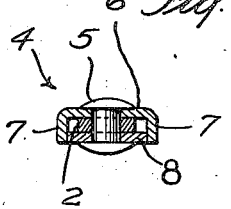
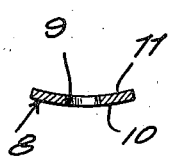
INVENTOR
THEODORE J. SMULSKI
BY
Clarence M. Crews
ATTORNEY Patented Aug. 13, 1946

2,405,910

UNITED STATES PATENT OFFICE 2,405,910

WINDSHIELD WIPER

Theodore J. Smulski, Gary, Ind., assignor to Productive Inventions, Inc., a corporation of Indiana Application November 27, 1943, Serial No. 511,945

6 Claims. (Cl. 15—250)

This invention relates to windshield wiper arms and more particularly to wiper blade connector means secured upon the outer end of a wiper arm and adjustable angularly about a fore and aft axis relative to the wiper arm to determine and maintain any desired angular relation (within limits) of the wiper blade to the wiper arm.

The present invention is in the nature of an improvement upon the invention disclosed and claimed in United States Letters Patent #2,290,140 granted to John W. Anderson on July 14, 1942.

In the structures illustratively disclosed in said patent a connector assembly is provided on the outer end of a windshield wiper arm, said assembly being in the form of a composite lever structure which comprises a hooked arm and a channeled arm having flat body portions disposed in juxtaposed relation, said body portions being clamped together and clamped frictionally to the wiper arm with capacity for angular adjustment relative thereto by means of a pivot rivet passed through the wiper arm and through said body portions in a fore and aft direction.

In the illustrative construction of the patent the mid-point of the wiper blade could be aligned or very nearly aligned with the rivet axis, and hence the center of resistance to wiper operation caused by frictional engagement of the wiper blade with the windshield could be made to coincide with the rivet axis or to be displaced outwardly only a short distance beyond the rivet axis. The effective lever arm of such resisting force, which would seek to overcome the frictional holding force and to dislodge the connector assembly from its set position of angular adjustment, could, therefore, be made very short. For many conditions of service the fritcional mounting of the connector assembly and wiper arm as illustratively disclosed in the patent, is practical and entirely satisfactory.

In connection with some forms of wiper and wiper blade connectors, however, as in the form of connector illustratively disclosed herein, it is not feasible to locate the center of wiper resistance in very close proximity to the axis of the connector lever. In such a case the provision of a more secure frictional holding means is desirable, and this is particularly true if the wiper be of one of the heavy duty types; i. e., of one of the types employed in trucks, busses or aircraft.

When flat members are pressed together and clamped by a pivot rivet as in the illustrative construction of the patent, the flat members are placed under maximum strain and are caused to produce the maximum frictional resistance to relative turning movement of the clamped parts in the area immediately adjacent to the rivet, the strain of the clamped members and the frictional binding engagement diminishing rapidly from the rivet outward, and soon becoming negligible in value, if the parts clamped together are not very rigid. If the clamped parts are all rigid, they are especially responsive to vibration shocks and are not, therefore, well adapted to resist disarrangement when exposed to vibration. The area of effective frictional engagement is, therefore, necessarily slight, and since this area is near the axis of the rivet, the frictional force acts about a very short lever arm so that it can have relatively little effect in resisting turning moments.

It is the primary object of the present invention to provide a frictionally held connector lever in which a greatly enhanced frictional resistance to turning of the lever is made available.

To this end, it is a salient feature of the invention that a spring plate having a concave face disposed toward a member to which it is to be frictionally clamped, is formed with a central aperture, is strained within its elastic limit to flatten it completely or to a substantial degree, and is held in that strained condition to the wiper arm and the connector lever by through fastener means which defines an axis of pivotal adjustment and applies the straining and clamping pressure to the spring plate marginally of the central aperture therein.

By this means it is possible greatly to increase the effective lever arm of the frictional resistance to turning. Instead of frictional pressure being localized near the rivet, the pressure can be distributed through the outer portion of the spring plate, and concentrated in the outer marginal portion of such area, as desired.

Other objects and advantages will hereinafter appear.

In the drawing forming part of this specification

Fig. 1 is a fragmentary side view showing a practical and advantageous wiper connector illustrative of the invention, in association with a wiper arm and a wiper blade;

Fig. 2 is a transverse sectional view of the structure illustrated in Fig. 1, the section being taken upon the line 2—2 of Fig. 1 looking in the direction of the arrows;

Fig. 3 is a transverse sectional view of the structure illustrated in Fig. 1, the section being taken upon the line 3—3 of Fig. 1, looking in the direction of the arrows;

Fig. 4 is a fragmentary front view of the wiper arm and wiper arm connector illustrated in Fig. 1;

Fig. 5 is a detail sectional view taken upon the line 5—5 of Fig. 1 looking in the direction of the arrows;

Fig. 6 is a detail sectional view of the clamping spring plate employed in the illustrative structure.

In the illustrative construction of the drawing a wiper arm 1 comprises an outer flat section 2 by which a wiper blade 3 is carried. The wiper blade 3 is not directly mounted upon the arm section 2, but is mounted upon a blade-carrying lever 4 which is pivotally attached to the arm section 2 by any suitable through fastener means such as a rivet 5. The arm section 2 and the lever 4 have overlapped flat body portions through which the rivet 5 is passed in a fore and aft direction to define an axis of pivotal adjustment for the lever 4 relative to the arm section 2, and to apply a firm clamping pressure for retaining the lever 4 frictionally in any position of adjustment to which it may be set.

The lever 4 is a channeled or female member, being provided with rearwardly extending side walls 7 which extend in parallel relation at opposite sides of the arm section 2 with sufficient space intervening between the walls 7 and the side or edge portions of the arm section 2 to admit of the desired range of pivotal adjustment.

A spring plate 8 is formed with a central aperture 9 through which the rivet 5 is passed, the body portion 6 of the lever 4, the overlapped body portion of arm section 2 and the spring plate 8 being firmly clamped together by the rivet. The plate 8 is formed with straight side edge portions to fit between the side walls 7 of the lever 4 so that the plate 8 and the lever 4 are held against relative rotation, and, therefore, are turned in unison when the lever is adjusted about the rivet axis relative to the arm section 2.

In order that the rivet may be caused through the spring plate to apply a firm, distributed, effective frictional resistance to rotation of the lever 4 relative to the arm section 2, the spring plate 8 is initially arched or bowed, being formed with a convex face 10 and with a concave face 11. When the parts are assembled as illustrated in Fig. 5 the concave face 11 of the spring plate 8 is the face which is disposed adjacent the arm section 2. The spring plate is strained within its elastic limit to a condition in which the concave face 11 is flattened or flattened to a substantial degree, to apply clamping pressure to the arm section 2 over a substantial area, but particularly at the inner and outer extremities of the spring plate which lie remote from the rivet axis.

The rivet maintains the spring plate in the deformed condition described, but since the spring plate is deformed within its elastic limit, its tendency is to spring outward and to resume its original shape. The pressure applied centrally to the spring plate by the rivet, therefore, tends to press the edges or margins of the spring plate forcibly against the arm section 2 and to apply the major portion of the clamping pressure and, therefore, of the frictional holding force through the outer margin of the spring plate. A frictional force so applied is especially effective to resist rotation of the unit formed by the lever 4 and the spring plate 8 relative to the arm section 2 because of the substantial effective lever arm through which the frictional force acts.

The lever mounting just described has been found to be a very advantageous mounting for securely retaining the lever 4 and the wiper blade 3, carried by the lever, in different set positions of angular adjustment relative to the arm section 2. The described construction is exceptionally advantageous when employed with wiper blade connector means of the kind herein illustratively disclosed.

The body portion 6 of the lever 4 extends outward beyond the outer end of the arm section 2 and is formed with an elongated slot 12 for receiving an elongated hooked web 13 of a rocker plate 14 which constitutes one element of a connector carried by the wiper blade 3.

The wiper blade 3 comprises the usual flexible wiping element 15 and the usual rigid, channeled holding frame 15a therefor. A cage clip 16 is fixedly secured to the wiper blade in any suitable manner, as by means of a rivet 17 which is passed through side walls 18 of the cage clip, through both walls of the blade frame 15a, and through the inner body portion of the flexible wiping element 15. The cage clip is in the form of a U-shaped member comprising side members 18 and central body members 19. End ears 20 are folded rearwardly from the body portions 19 and engage the front of the blade frame 15a. The clip 16 is formed with a large central cut-out 21, as illustrated, so that the central body portion and substantial portions of the side members 18 are removed.

The rocker plate 14 includes a horizontal web 22 which extends the full distance between opposite ears 20, its end portions being disposed between the body portions 19 of the clip 16 and the front of the wiper frame 15a, being entrapped thereby. A bowed leaf spring 23 is disposed between the web 22 and the front of the blade frame 15a engaging between its ends with the blade frame 15a and at its ends with the end portions of the web 22, and serving thereby to press the end portions of the web 22 yieldingly into continuous engagement with the body portions 19 of the cage clip 16. The spring 23, like the web 22, is entrapped by the cage clip 16 and the blade frame 15a.

The rocker plate 14 further includes a forwardly extending side web 24, a transversely extending abutment web 25, and the forwardly extending intermediate web 13 which is in the form of an elongated hooked plate as already described.

The web 24 is adapted, when the parts are in assembled relation, to be engaged by a rearwardly inclined lip 26 formed on the outer extremity of the body portion 6 of the lever 4.

The wiper blade 3 may be quickly and conveniently attached to or detached from the lever 4. When a wiper blade is to be attached to the lever 4, it is first associated in an inverted condition with the lever, the hook 27 being placed behind the slot 12, then passed through it, and the web 13 is finally worked through the slot as the wiper blade is turned over end for end. In the final assembled relation, the main body portion of the web 13 substantially fills the length and width of the slot 12. The wiper arm section 2, as usual, is spring biased toward the windshield, and the lip 26 engaging the web of the rocker 14 presses the wiper blade toward the windshield. Since the lip 26 presents a transversely extending straight edge in contact with the flat forward face of the transverse web 25, and since these surfaces are spring urged into engagement with one another, this spring pressure tends to maintain the rocker 14 against tilting about a longitudinal axis relative to the lever 4. As a means of positively limiting tilting of the rocker 14 relative to the lever 4, the lever 4 is provided with side wall portions 28 which extend rearwardly beyond the transverse web 22 of the rocker and in proximity to the side boundaries thereof.

As is usual in the employment of a wiper blade connector of the cage clip and rocker blade type, the wiper blade has limited capacity for universal movement relative to the rocker plate; that is to say, it may rock to a limited extent about a transverse axis as permitted by flexure of the spring 23, or it may tilt to a limited extent about a longitudinal axis as permitted by flexure of the spring 23.

In the described construction the mid-point of the wiper blade 3 is located at a substantial distance outward from the axis of the rivet 5, so that the center of resistance to wiper operation resulting from frictional engagement of the wiper blade with the windshield is applied through an effective lever arm of substantial length to the lever 4. The strong and effective frictional holding pressure made available through the utilization of the normally concave spring plate 8 is quite adequate to assure that the lever 4 will not be accidentally dislodged from its set position of adjustment, notwithstanding the long effective lever arm through which the resisting force acts.

With the illustrative construction, however, it is feasible, if desired, to mount the clip 16 non-centrally upon the wiper blade 3 so as to shift the center of frictional wiping resistance inward and, therefore, nearer to the axis of the rivet 5. This is particularly true because of the length of engagement of the web 13 with the slot 12, which assures adequate and firm resistance to any twisting tendency of the wiper blade relative to the connector lever 4, engendered by separation of the blade and arm connection from the center of wiping resistance.

A further point which should be particularly noted is the fact that in the present construction the lever 4 is applied to a flat end portion of arm section, and that it may, therefore, be made, as illustrated, broad enough to extend completely across the end of the arm section and to embrace it, so that a sturdy construction is provided at the pivot, and the area of frictional engagement is co-extensive in width with the width of the arm section.

I have described what I believe to be the best embodiments of my invention. I do not wish, however, to be confined to the embodiments shown, but what I desire to cover by Letters Patent is set forth in the appended claims.

I claim:

1. In a windshield wiper, the combination with a wiper arm member, of a blade-carrying connector lever member mounted thereon with capacity for angular adjustment relative to said arm member, said arm member and connector lever member having flat body portions disposed in overlapped relation, a spring plate having a normally concave face overlying such portion of one of the members with the concave face adjacent thereto, said spring plate being held positively against rotation relative to the other member by interfitting engagement therewith, and said spring plate being deformed within its elastic limit and pressed toward the adjacent one of said body portions to apply distributed clamping pressure thereto, a clamping fastener passing through said overlapped portions of the arm member and lever member and through the spring plate in a fore and aft direction to define an axis of adjustment for the connector lever and to maintain the deformed condition of the spring plate for applying firm frictional holding pressure over an area remote from the fastener axis.

2. In a windshield wiper, the combination with a wiper arm section, of a blade-carrying connector lever mounted thereon with capacity for angular adjustment relative to said arm section, said arm section and connector lever having flat body portions disposed in overlapped relation, the body portion of the lever being broader than that of the arm and having side walls extending rearwardly at opposite sides of the arm portion and spaced therefrom, a spring plate having a normally concave face disposed behind the body portion of the arm section with the concave face adjacent to such body portion of the arm section, said spring plate fitting between the side walls of the lever, being held by the side walls against rotative movement relative to the lever, and being deformed within its elastic limit to a condition in which the normally concave face is flattened to a substantial degree, and through fastener means passed through said overlapped portions of the arm section and lever and through the spring plate in a fore and aft direction to define an axis of adjustment for the connector lever and to maintain the deformed condition of the spring plate for applying firm frictional holding pressure over areas of said overlapped portions of the arm section and the lever remote from the fastener axis.

3. In a windshield wiper, the combination with a wiper arm member, of a blade-carrying connector lever member mounted thereon in overlapping relation thereto with capacity for angular adjustment relative to said arm member, one of said members being provided with a female part having abutment means, an element laterally engageable with the abutment means of said female part, a fastener extending through said element and female part engageable with said members so as to hold said members in fixed relationship under pressure exerted by the fastener.

4. In a windshield wiper, the combination with a wiper arm member, of a blade-carrying connector member mounted thereon in an overlapping relation thereto with capacity for angular adjustment relative to said arm member, one of said members being provided with a female part having abutment means, an element laterally engageable with said abutment means, a fastener extending through said element and female part engageable with said members so as to hold said members in fixed relationship under pressure exerted by the fastener and permit said connector member to be moved to an infinite number of positions within a predetermined range of pivotal movement.

5. In a windshield wiper, the combination with a wiper arm member, of a blade-carrying connector member mounted thereon with capacity for angular adjustment relative to said arm member, a female structure provided on one of said members and having laterally disposed abutment portions, a friction element disposed in said female structure and having portions engageable with said abutment portions at points remote from the center of said element, and fastener means for holding the members in fixed relationship under pressure exerted by the fastener means whereby said friction element may serve to retard pivotal movement between said members.

6. In a windshield wiper, the combination with a wiper arm member, of a blade-carrying connector member mounted thereon in an overlapping relation with capacity for angular adjustment relative to said arm member, one of said members being provided with a female part, an element constructed and arranged to engage said female part internally and overlie one of said members, and holding means extending through said element and female part provided with means overlying one of said members and connected to the other member so as to hold said members assembled in fixed relationship under pressure exerted by the holding means.

THEODORE J. SMULSKI.

Certificate of Correction

Patent No. 2,405,910.  August 13, 1946.

THEODORE J. SMULSKI

It is hereby certified that errors appear in the printed specification of the above numbered patent requiring correction as follows: Column 6, line 30, claim 2, strike out "through" first occurrence; same line, for "passed" read *passing*; line 36, for "areas" read *an area*; and that the said Letters Patent should be read with these corrections therein that the same may conform to the record of the case in the Patent Office.

Signed and sealed this 5th day of November, A. D. 1946.

[SEAL]

LESLIE FRAZER,
*First Assistant Commissioner of Patents.*